Figure 1:
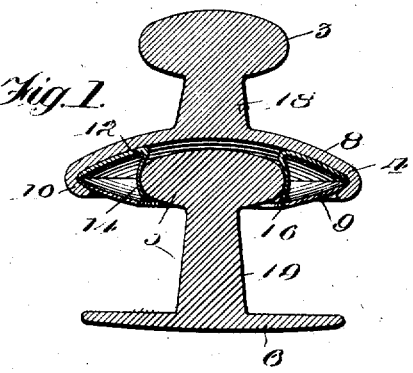
Figure 2:
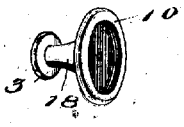
Figure 3:
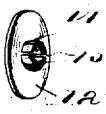
Figure 4:
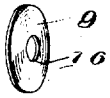
Figure 5:
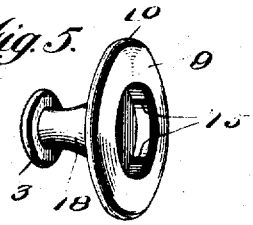
Figure 6:
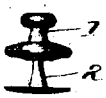

No. 12,020. Reissued Aug. 19, 1902.

G. W. BUCHANAN.

BUTTON.

(Application filed May 16, 1902.)

Witnesses:

H. L. Gaither

Clara C. Cunningham

Inventors:

George W. Buchanan by Lambert & Atkinson

Attorneys.

UNITED STATES PATENT OFFICE.

GEORGE W. BUCHANAN, OF CHICAGO, ILLINOIS.

BUTTON.

SPECIFICATION forming part of Reissued Letters Patent No. 12,020, dated August 19, 1902.

Original No. 673,698, dated May 7, 1901. Application for reissue filed May 16, 1902. Serial No. 107,693.

*To all whom it may concern:*

Be it known that I, GEORGE W. BUCHANAN, of Chicago, in the county of Cook, State of Illinois, have invented certain new and useful Improvements in Buttons, of which the following is a complete specification, reference being had to the accompanying drawings.

The object of my invention is to produce an improved button for detachably fastening a cuff to a shirt-wristband or for similar purposes.

In the class to which my invention belongs it is desirable to keep both the wristband and the cuff confined when they are separated as well as when they are united. My invention not only meets this requirement, but also affords a simple and elegant device for personal wear by the aid of which, for example, a cuff may be conveniently attached to or removed from a wristband whenever required and by the simplest manipulation.

In the accompanying drawings, Figure I is a section of my button complete on a highly-magnified scale. Fig. II is a perspective view of the main portion of one part of my button detached. Fig. III is a similar view of the clip-ring designed to be assembled with the subject-matter of Fig. II detached. Fig. IV is a similar view of the clip-ring-confining member detached. Fig. V is a perspective view, on an enlarged scale, of the subjects-matter of Figs. II to IV, inclusive. Fig. VI is a side elevation of my button complete drawn approximately to the scale for ordinary use.

Referring to the numerals on the drawings, it may be specified that my button consists, broadly, of a pair of stud-buttons 1 and 2 (see Fig. VI) and means for detachably uniting the head of one to the base of the other. By the term "stud-button" in this connection I designate a button having a head and base united by a shank.

3 indicates the head of the stud-button 1, and 4 its base. 5 indicates the head, and 6 the base, of the stud-button 2. The heads 3 and 5 may be of any preferred shape and dimensions, while similar latitude as to the shape of the bases is contemplated under the scope of my invention.

As the preferred means for detachably uniting the buttons 1 and 2 I provide one of the bases—the base 4, for example—with a shallow recess adapted to receive and snugly fit the head of the other button, in this instance the head 5. Within the said recess I provide means for holding the said head.

According to the present preferred mode of construction the recess in the base 4 and the head-retaining mechanism therein are formed as follows: The button 1 is first provided with a comparatively thin base-plate 8, against the face of which is fitted an annular clip-ring-confining member 9, whose diameter is sufficiently less than that of the plate 8 to permit of the marginal infolding of the plate 8 upon the member 9. This infolding (indicated at 10) may be accomplished in any suitable manner and by any preferred means—as, for example, by crimping, stamping, or spinning.

Between the member 9 and the plate 8 is confined by the infolding process above referred to a "clip-ring" 12, so designated because it preferably comprehends means for clipping or holding the head 5. Such means preferably consist of resilient clips 14, defined as by kerfs 15, formed in the ring 12. The ring 12, with its clips 14, may be struck by a suitable die from a disk of resilient metal, the clips being upset by the stroke of the die into position at an angle to the body of the ring 12. The clips 14 are ranged around the inner diameter of the ring 12, which, being substantially equal to that of the inner edge 16 of the member 9, defines with it the recess above referred to for the reception of the head 5. The clips 14 are tilted slightly from their respective bases toward the center of said recess, so that, opposing the insertion of the head 5, they may yield to admit the head and spring back about the head after it has fully entered the recess to clip and retain it.

The above-described head-retaining mechanism constitutes, as specified, preferred means for detachably uniting the buttons 1 and 2; but I do not intend to restrict my invention either to the details of construction thereof or to retaining mechanism of a generally similar character. It is obvious that the retaining mechanism is closely analogous to similar mechanisms used, for instance, in glove-fasteners and other articles of apparel.

and it is equally obvious that mechanism for detachably uniting the two buttons might be devised without departing from the principle of my invention. Such modifications are, however, entirely subordinate, as they would be suggested by a knowledge of my invention in its preferred form of embodiment and within its broader scope.

Although not altogether essential to this specification, it may be stated that inasmuch as each of the buttons 1 and 2 is required in practice to confine but two members instead of three or four the shanks 18 and 19 thereof, respectively, may be made shorter than in the ordinary stud-button, thereby restricting the length of the composite button. This observation is made with special reference to Fig. I of the drawings, in which the length of the shank 19 is shown, with a view to clearness, somewhat exaggerated.

My button may be made of any suitable and preferred material or materials.

What I claim is—

1. The combination of two stud-buttons each comprising a base and a head, the base of one provided on its under side within the confines of its edge with means for engaging the head of the other.

2. The combination of two stud-buttons each comprising a base and a head, the base of one provided on its under side with a recess adapted to receive the head of the other button, and retaining mechanism for holding said head in said base, said retaining mechanism being within the confines of the edge of the base.

3. The combination of a pair of stud-buttons each comprising a base and a head, the base of one being provided with a recess adapted to receive the head of the other, and head-retaining mechanism contained entirely in the base, within said recess.

4. As a new article of manufacture the combination with a stud-button comprising a head, shank, and base, of a recess in said base adapted to receive the head of another stud-button, and head-retaining mechanism contained entirely in the base, within said recess.

In testimony whereof I sign this specification in the presence of two witnesses.

GEORGE W. BUCHANAN.

Witnesses:
H. S. GAITHER,
CLARA C. CUNNINGHAM.